United States Patent
Gregory

(10) Patent No.: US 6,948,007 B2
(45) Date of Patent: Sep. 20, 2005

(54) METHOD AND APPARATUS FOR CONFIGURING INTEGRATED CIRCUIT DEVICES

(75) Inventor: Paul E. Gregory, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 669 days.

(21) Appl. No.: 10/034,245

(22) Filed: Dec. 20, 2001

(65) Prior Publication Data

US 2003/0120832 A1 Jun. 26, 2003

(51) Int. Cl.[7] ............................................. G06F 3/00
(52) U.S. Cl. ................................ 710/8; 713/1; 710/10
(58) Field of Search .......................... 710/8, 10; 713/1, 713/2, 100; 326/40

(56) References Cited

U.S. PATENT DOCUMENTS

| | | | |
|---|---|---|---|
| 5,493,239 A | * | 2/1996 | Zlotnick ................... 326/38 |
| 5,590,305 A | * | 12/1996 | Terrill et al. ............. 711/103 |
| 5,594,442 A | | 1/1997 | Paulos et al. |
| 5,835,503 A | | 11/1998 | Jones et al. |
| 5,838,167 A | * | 11/1998 | Erickson et al. .......... 326/38 |
| 5,881,281 A | | 3/1999 | Gates et al. |
| 5,923,614 A | * | 7/1999 | Erickson et al. ......... 365/236 |
| 6,097,211 A | * | 8/2000 | Couts-Martin et al. ..... 326/40 |
| 6,112,303 A | | 8/2000 | Stancil |
| 6,137,738 A | | 10/2000 | Vorgert |
| 6,201,406 B1 | | 3/2001 | Iwanczuk et al. |
| 6,226,729 B1 | | 5/2001 | Stevens et al. |
| 6,260,087 B1 | | 7/2001 | Chang |
| 6,262,596 B1 | | 7/2001 | Schultz et al. |
| 6,314,550 B1 | * | 11/2001 | Wang et al. ............... 716/17 |
| 6,820,197 B2 | * | 11/2004 | Benedix et al. ............ 713/1 |
| 2001/0008005 A1 | | 7/2001 | Stevens et al. |
| 2003/0120832 A1 | * | 6/2003 | Gregory .................... 710/8 |

* cited by examiner

*Primary Examiner*—Fritz Fleming

(57) ABSTRACT

A method for configuring a plurality of controlling devices includes storing first configuration data for a first one of the controlling devices in a data device. The first configuration data is transmitted from the data device to the first controlling device. Second configuration data for a second one of the controlling devices is stored in the data device. The second configuration data is transmitted from the data device to the second controlling device.

15 Claims, 4 Drawing Sheets

METHOD AND APPARATUS FOR CONFIGURING INTEGRATED CIRCUIT DEVICES

BACKGROUND OF THE INVENTION

The present invention relates to the electronics programming arts. It finds particular application in conjunction with configuring integrated circuit ("IC") devices used as controlling devices and will be described with particular reference thereto. It will be appreciated, however, that the invention is also amenable to configuring other types of IC devices.

An IC controlling device (e.g., a microprocessor device (a central processing unit ("CPU")) and/or an Application Specific Integrated Circuit ("ASIC")) requires an internal configuration to be loaded from an external source upon being reset (e.g., when power is applied). A conventional approach for providing configuration data to the controlling device involves the use of a plurality of configuration pins on the controlling device. The logical signals communicated to the various configuration pins are static. In other words, once the configuration pins are set to either a logical high or low, the logical states of the configuration pins do not change and, furthermore, the controlling device is configured.

One drawback to this conventional approach for configuring a controlling device is that because the configuration pins are hardwired, the logical signals transmitted to the respective configuration pins are static. Therefore, the number of possible configurations for the controlling device is proportional to the number of configuration pins. As such, the flexibility of the controlling device is limited. At the same time, the cost of manufacturing the controlling device is proportional to the number of pins. Consequently, conventional controlling devices that include several configuration options must include a proportional number of configuration pins and, furthermore, are relatively expensive.

Another conventional approach for providing configuration data to the controlling device involves the use of a previously configured electrically erasable programmable read only memory (EEPROM) or other data source, which is hard-wired to the controlling device. More specifically, a plurality of pins (e.g., four (4)) on the EEPROM are hard-wired to a plurality (e.g., four (4)) of configuration pins on the controlling device. Upon power-up (reset), the controlling device reads the contents (configuration data) of the EEPROM via the configuration pins.

The controlling device is typically configured by transmitting respective "high" and "low" logical signals (configuration data) from the pins on the EEPROM to the plurality of configuration pins on the controlling device. The logical signals communicated to the various configuration pins are used only for configuring that device. Configuration of a second controlling device requires a second configuration data source and has associated corresponding costs.

The present invention provides a new and useful method and system of configuring IC controlling devices that addresses the above problems.

SUMMARY OF THE INVENTION

In one embodiment of the present invention, a method for configuring a plurality of controlling devices includes transmitting first serial configuration data from a data device to a first one of the controlling devices. Second serial configuration data is transmitted from the data device to a second one of the controlling devices.

In accordance with one aspect of the present invention, a method for transmitting configuration data to a plurality of integrated circuit devices includes receiving a first signal into a data storage device from a first of the integrated circuit devices. A first portion of the configuration data, which is associated with the first integrated circuit device, is serially transmitted from the data storage device to the first integrated circuit device as a function of the first signal. A second signal is received from a second of the integrated circuit devices into the data storage device. A second portion of the configuration data, which is associated with the second integrated circuit device, is serially transmitted from the data storage device to the second integrated circuit device as a function of the second signal.

In accordance with another aspect of the present invention, a plurality of signals executable on a computing device, which includes a data device, a first controlling device electrically communicating with the data device, and a second controlling device electrically communicating with both the data device and the first controlling device, include configuration data signals and control signals. The configuration data signals are stored on a computer readable medium, which communicates with the data device. The control signals are generated within the first and second controlling devices for managing transmissions of the configuration data signals from the data device to the first and second controlling devices.

BRIEF DESCRIPTION OF THE DRAWINGS

The invention may take form in various components and arrangements of components, and in various blocks and arrangements of blocks. The drawings are only for purposes of illustrating a preferred embodiment and are not to be construed as limiting the invention.

DETAILED DESCRIPTION OF THE PREFERRED EMBODIMENTS

The following includes definitions of exemplary terms used throughout the disclosure. Both singular and plural forms of all terms fall within each meaning:

"Computing device", as used herein, includes but is not limited to a programmable machine that responds to a specific set of instructions in a well-defined manner and executes a prerecorded list of instructions (e.g., a program). The term "computer" is synonymous with "computing device."

"Integrated Circuit" ("IC"), as used herein, includes, but is not limited to a small electronic device made out of a semiconductor material. Integrated circuits are used for a variety of devices, including microprocessors, application specific integrated circuits (ASICs) and data storage devices, in, for example, audio and video equipment, and automobiles.

"Chip", as used herein, includes but is not limited to a small piece of semiconducting material (usually silicon) on which an IC is embedded. Computing devices consist of many chips placed on electronic boards called printed circuit boards. Different types of chips include, for example, CPU chips (also called microprocessors), which contain an entire processing unit, and memory chips, which store data.

"Device", as used herein, includes any machine or component that attaches to a computing device. Examples of peripheral devices, which are separate from a main computing device, include disk drives, printers, mice, and modems. Examples of integrated devices, which are incorporated into a main computing device, include central processing units and application specific integrated circuits. Most devices, whether peripheral or not, require a program called a device driver that acts as a translator, converting general commands from an application into specific commands that the device understands.

"Computer Readable Medium", as used herein, includes but is not limited to any memory device, storage device, compact disc, floppy disk, or any other medium capable of being interpreted by a computer.

"Software", as used herein, includes but is not limited to one or more computer executable instructions, routines, algorithms, modules or programs including separate applications or from dynamically linked libraries for performing functions and actions as described herein. Software may also be implemented in various forms such as a servlet, applet, stand-alone, plug-in or other type of application. Software can be maintained on various computer readable mediums as is known in the art.

"Signal", as used herein, includes but is not limited to one or more signals, a bit stream, an algorithm, a routine, a program or the like. The term "command" is synonymous with "signal."

"Network", as used herein, includes but is not limited to the internet, intranets, Wide Area Networks (WANs), Local Area Networks (LANs), and transducer links such as those using Modulator-Demodulators (modems).

Figure 1:
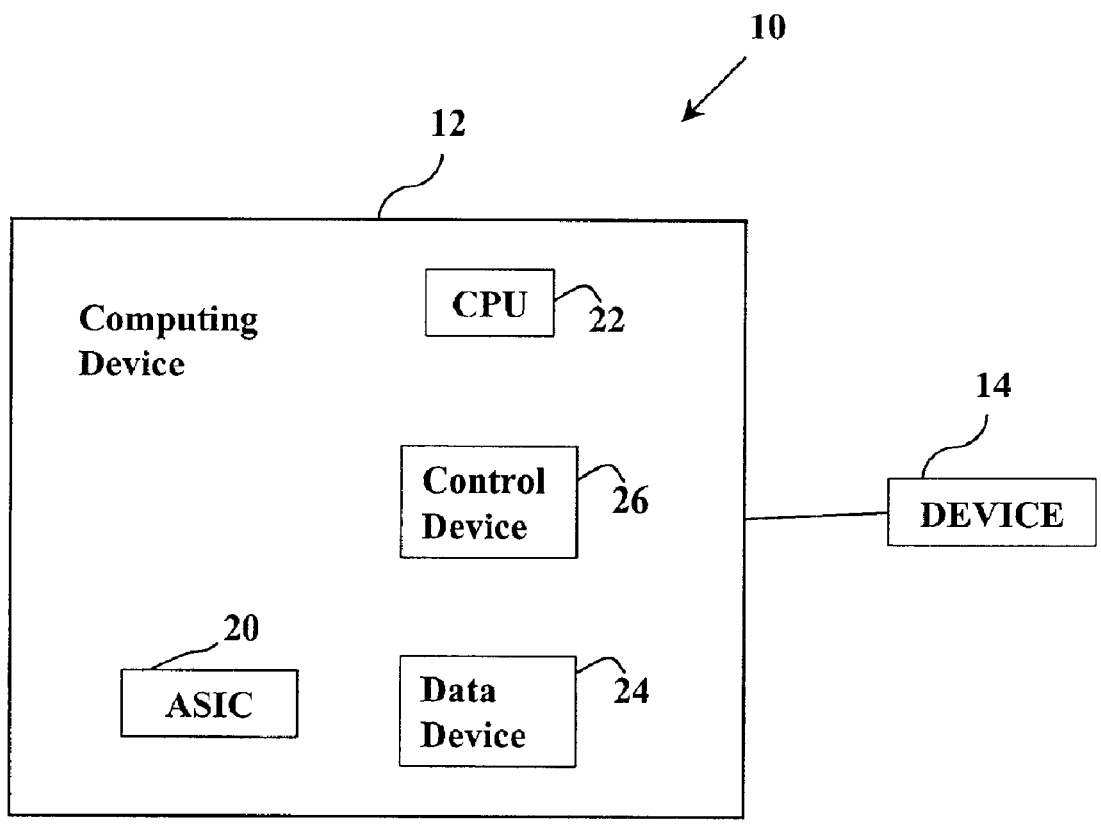
FIG. 1 illustrates an exemplary overall system diagram in accordance with one embodiment of the present invention.

Illustrated in FIG. 1 is an exemplary overall system diagram of the present invention. A system 10 includes a computing device 12 and a device 14 (e.g., an output device). It is contemplated that the output device 14 is a printing device; however, other output devices (e.g., video devices) are also considered. Although the output device 14 is illustrated as being external to the computing device 12, it is also contemplated to incorporate the output device 14 into the computing device 12.

The computing device 12 includes first and second configurable devices 20, 22, respectively (e.g., IC chips). In the embodiment illustrated, the first configurable device 20 is an application device (e.g., an ASIC), and the second configurable device 22 is a processing device (e.g., a central processing unit ("CPU")). However, other types of configurable devices are also contemplated. The computing device 12 also includes a data device 24 (e.g., a computer readable medium ("CRM")) for storing data signals. At least some of the data signals stored in the data device 24 are configuration data signals, which are transmitted to the configurable devices 20, 22 during a configuration process. A control device 26 (e.g., at least one of a power supply, voltage monitor, and any other control device) controls operation of the devices 20, 22, 24 within the computing device 12.

Figure 2:
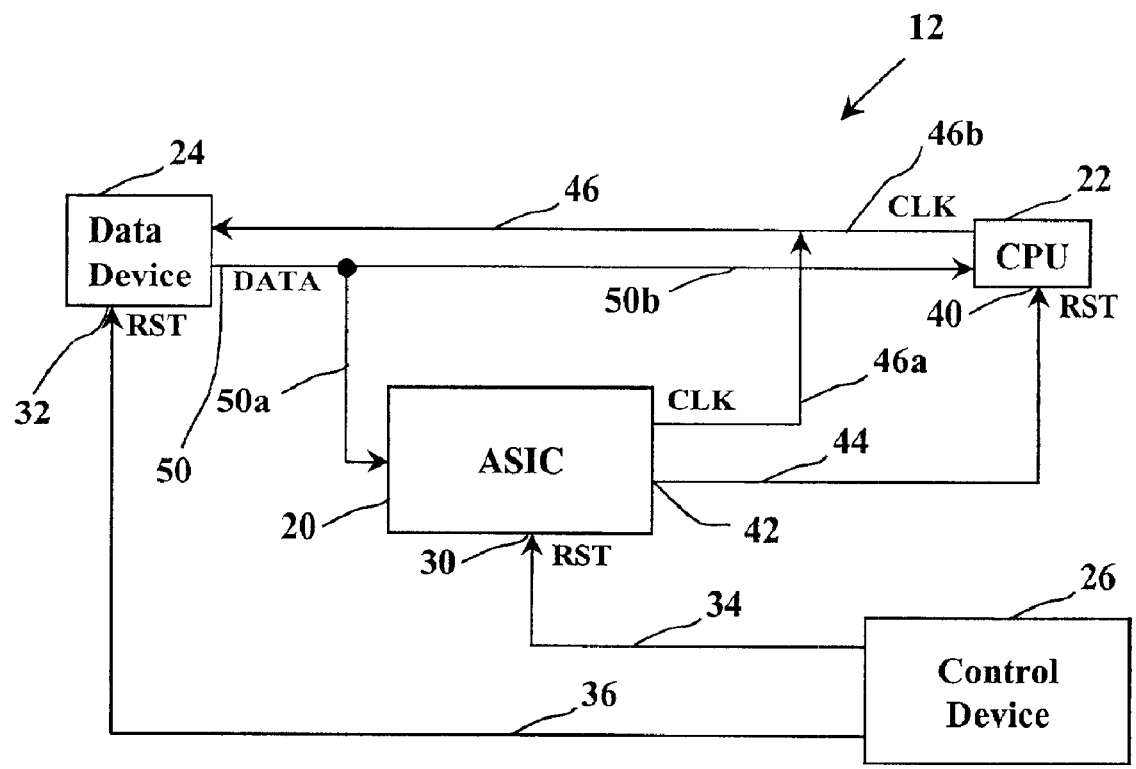
FIG. 2 illustrates an exemplary schematic diagram in accordance with another embodiment of the present invention.
Figure 3:
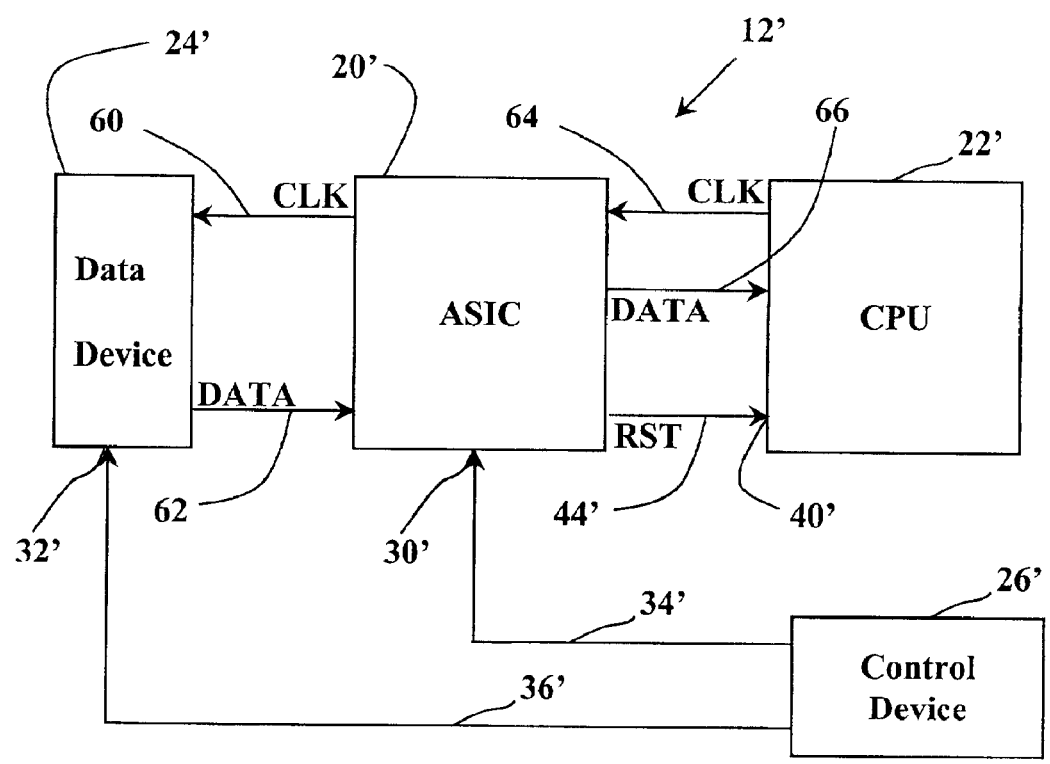
FIG. 3 illustrates an exemplary schematic diagram in accordance with another embodiment of the present invention.

Illustrated in FIGS. 2 and 3 are exemplary schematic diagrams of the computing device 12 in accordance with first and second embodiments, respectively, of the present invention. For ease of understanding the distinctions between the two (2) embodiments, like components are designated in FIG. 3 by like numerals with a primed (') suffix while unique components are designated by distinct numerals.

Figure 4:
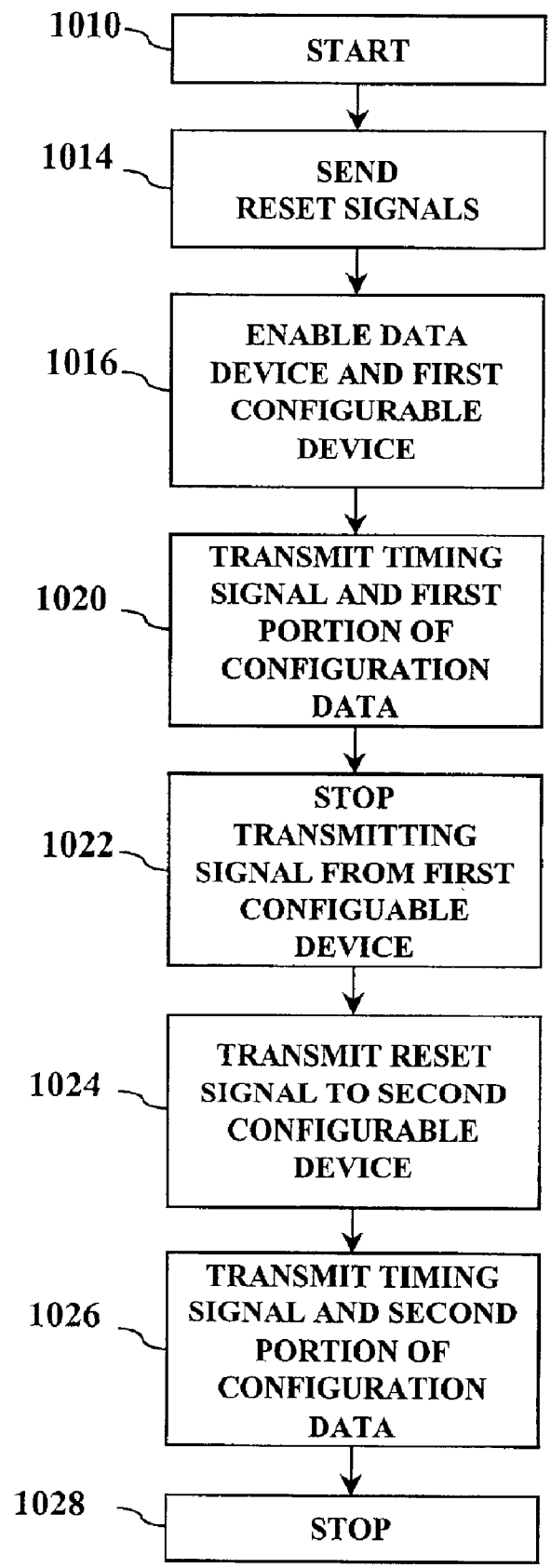
FIG. 4 illustrates an exemplary implementation methodology of configuring configurable devices in accordance with one embodiment of the present invention.

Illustrated in FIG. 4 is an exemplary implementation methodology of configuring configurable devices in accordance with the present invention. The blocks shown represent functions, actions or events performed therein. It will be appreciated that computer state machines or microcode involve dynamic and flexible processes such that the illustrated blocks can be performed in other sequences different than the one shown.

With reference to FIGS. 1–4, a process for configuring the configurable devices 20, 22 starts in a block 1010. Configuration data is previously stored in the data device 24. As discussed below, the configuration data is used for configuring the first and second configurable devices 20, 22. For reasons discussed below, the configuration data is referred to as serial data.

Respective reset signals are transmitted from within the computing device 12 to the first configurable device 20 and the data device 24 in a block 1014. It is contemplated that the reset signals be transmitted when the control device 26 powers-up the computing device 12; alternatively, the reset signals are transmitted on-demand when a user of the system 10 issues a command, for example, to re-boot the computing device 12. After receiving the reset signals, the first configurable device 20 and the data device 24 are enabled in a block 1016. More specifically, reset pins 30, 32 of the first configurable device 20 and the data device 24, respectively, communicate directly with the control device 26 via data lines 34, 36, respectively. When the control device 26 is activated, logical signals are transmitted from the control device 26 to the reset pins 30, 32 of the first configurable device 20 and the data device 24, respectively. The logical signals (e.g., either logical high or low signals) transmitted to the pins 30, 32 at power-up activate the respective devices 20, 24.

Although the second configurable device 22 is controlled by the control device 26, a reset pin 40 of the second configurable device 22 does not directly communicate with a logical output pin of the control device 26; instead, as discussed in more detail below, the reset pin 40 communicates with a logical output pin 42 of the first configurable device 20 via a communication line 44. Therefore, although the second configurable device 22 is powered-up along with the computing system 12, the device 22 is neither reset nor enabled by the first configurable device 20 and the data device 24.

Once the first configurable device 20 and the data device 24 are enabled, the first configurable device 20 generates signals (e.g., timing or control signals) transmitted, in a block 1020, from the first configurable device 20 to the data device 24 along a communication line 46, 60 (see FIGS. 2 and 3, respectively). With reference to FIG. 2, the communication line 46 electrically splits into 46a, 46b. Therefore, the signals transmitted in the block 1020 are communicated along the path 46a, 46. With reference to FIG. 3, the communication line 60 is not electrically split and, therefore, the signals transmitted in the block 1020 are simply communicated between the devices 20', 24' along the line 60.

Referring again to FIGS. 1–4, once the data device 24 begins receiving the signals from the first configurable device 20, a first portion of the configuration data is transmitted from the data device 24 to the first configurable device 20. The first portion of the configuration data represents the configuration data associated with the first configurable device 20.

In the embodiment illustrated in FIG. 2, the first portion of the configuration data is transmitted from the data device 24 to the first configurable device 20 via a data line 50 as a function of the control (clock) signals transmitted along the communication line 46a, 46. In this embodiment, the data line 50 electrically splits into data line components 50a, 50b. Therefore, the first portion of the configuration data is transmitted to the first configurable device 20 via a path 50, 50a.

In the embodiment illustrated in FIG. 3, the first portion of the configuration data is transmitted from the data device 24' to the first configurable device 20', via a data line 62, as a function of the control (clock) signals transmitted along the communication line 60.

Referring again to FIGS. 1–4, because the data path 50, 50a; 62 (see FIGS. 2 and 3, respectively) represents only a single communication line between the first configurable device 20 and the data device 24, the configuration data is transmitted serially. In this case, the configurable device 20 generates a signal for causing the configuration data to be transmitted serially. However, other embodiments, in which the configuration data is transmitted in parallel, are also contemplated.

With reference to FIGS. 2 and 4, because the communication line 46 electrically splits into 46a, 46b, the data device 24 may receive signals from both the first and second configurable devices 20, 22. Consequently, a potential exists that the signals transmitted along the communication lines 46a, 46b could interfere with one another along the line 46. For this reason, the first and second configurable devices 20, 22 must be controlled so that only one of the devices 20, 22 is transmitting a signal to the data device 24 at any one time. Consequently, in a block 1022, after the first portion of the configuration data is transmitted to the first configurable device 20, the first configurable device 20 stops transmitting the control signal to the data device 24.

In a block 1024, the first configurable device 20 transmits a reset signal from the output pin 42 to the reset pin 40 of the second configurable device 22. It is contemplated that the reset signal transmitted in the block 1024 is a logical signal. Furthermore, when the computing device 12 is powered-up, an initial logical signal transmitted from the first to the second configurable devices 20, 22, respectively, is a logical high or a logical low for disabling the second configurable device 22. Then, in the block 1024, a logical signal, which is opposite to the initial logical signal, is transmitted for enabling the second configurable device 22. Once enabled, the second configurable device 22 begins transmitting, in a block 1026, signals (e.g., control, clock, or timing signals) to the data device 24.

With reference to FIGS. 2 and 4, the signals associated with the block 1026 are transmitted via a path 46b, 46. Furthermore, in the block 1026, a second portion of the configuration data is transmitted from the data device 24 to the second configurable device 22 via a path 50, 50b as a function of the control signals transmitted along the path 46b, 46. Therefore, the signals and the second portion of the configuration data are transmitted to the second configurable device 22 without passing through the first configurable device 20.

With reference to FIGS. 3 and 4, the signals associated with the block 1026 are transmitted from the second configurable device 22' to the first configurable device 20' via a communication line 64; then the signals are transmitted from the first configurable device 20' to the data device 24' via the communication line 60. Furthermore, in the block 1026, the second portion of the configuration data is transmitted from the data device 24' to the second configurable device 22' via the first configurable device 20'. More specifically, the second portion of the configuration data is transmitted, as a function of the signals transmitted from the first configurable device 20' to the data device 24', from the data device 24' to the first configurable device 20' via the data line 62; furthermore, the configuration data is then transmitted, as a function of the signals transmitted from the second configurable device 22' to the first configurable device 20', from the first configurable device 20' to the second configurable device 22' via a data line 66. It is to be understood that the data is at least one of stored in and passed through the configurable devices 20, 22.

With reference again to FIGS. 1–4, the second portion of the configuration data represents the configuration data associated with the second configurable device 22. As discussed above, although it is illustrated to transmit the configuration data serially from the data device 24 to the second configurable device 22, it is also contemplated to transmit the configuration data in parallel.

After the second portion of the configuration data is transmitted to the second configurable device 22, the process stops in a block 1028.

It is to be understood the devices 20, 22 are configured for different functions. For example, it is contemplated that the ASIC 20 is configured for controlling the output device 14. In this respect, the ASIC acts as a device driver for the output device 14. Furthermore, it is contemplated that the CPU 22 is configured for controlling the general operations of the computing device 12. However, the devices 20, 22 may also be configured as an interface to other devices (e.g., memory devices, audio devices, telephonic devices, and/or network devices).

The data device 22 is contemplated to be a static device. More specifically, it is contemplated that once configuration data is stored in the device 22, the data is retained until new configuration data is stored in the device 22. Consequently, it is contemplated that the data device 22 is an erasable programmable read-only memory ("EPROM"). However, it is also contemplated that the data device 22 is a programmable read-only memory ("PROM"), an electric erasable programmable read-only memory ("EEPROM"), or any other static/non-static computer readable medium. Furthermore, although the devices 20, 22, 24, 26 are illustrated as including a limited number of input/output ("I/O") pins, it is to be understood other numbers of I/O pins for each of the devices 20, 22, 24, 26 are contemplated.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method for configuring a plurality of controlling devices during a system reset of a computing device which includes at least a first controlling device, a second controlling device, and a data device that contains configuration data, the method comprising:

in response to a system reset of a computing device, resetting the data device and the first controlling device;

transmitting first configuration data from the data device to the first controlling device to configure the first controlling device; causing the first controlling device to reset the second controlling device; and transmitting second configuration data from the data device to the second controlling device.

2. The method for configuring a plurality of controlling devices as set forth in claim 1, further including:
before transmitting the first configuration data, transmitting a first timing signal from the first controlling device to the data device; and wherein transmitting the first configuration data includes:
transmitting the first configuration data from the data device to the first controlling device as a function of the first timing signal.

3. The method for configuring a plurality of controlling devices as set forth in claim 2, further including:
before transmitting the second configuration data, transmitting a reset signal from the first controlling device to the second controlling device.

4. The method for configuring a plurality of controlling devices as set forth in claim 3, further including:
before transmitting the second configuration data, transmitting a second timing signal from the second controlling device to the data device; and wherein transmitting the second configuration data includes:
transmitting the second configuration data from the data device to the second controlling device as a function of the second timing signal.

5. The method for configuring a plurality of controlling devices as set forth in claim 4, wherein transmitting the second configuration data further includes:
transmitting the second configuration data from the data device to the second controlling device as a function of the first timing signal.

6. The method for configuring a plurality of controlling devices as set forth in claim 4, wherein transmitting the second timing signal includes:
transmitting the second timing signal from the second controlling device to the data device without passing through the first controlling device.

7. The method for configuring a plurality of controlling devices as set forth in claim 1, wherein transmitting the second configuration data includes:
transmitting the second configuration data from the data device to the second controlling device via the first controlling device.

8. The method for configuring a plurality of controlling devices as set forth in claim 1, wherein transmitting the second configuration data includes:
transmitting the second configuration data from the data device to the second controlling device without passing through the first controlling device.

9. The method for configuring a plurality of controlling devices as set forth in claim 1, wherein at least one of the transmitting the first and second configuration data includes:
serially transmitting the configuration data from the data device to the respective one of the controlling devices.

10. A computing device comprising:

a processor;

a configurable logic device operably connected to the processor and being configured to provide a processor reset signal to the processor;

a data device for maintaining configuration data to the processor and the configurable logic device, the data device being in communication with the processor and the configurable logic device;

a power supply connected to the configurable logic device and the data device for providing a system reset signal in response to a reset of the computing device, the configurable logic device being configured to initiate receiving of configuration data from the data device in response to the system reset signal;

the configurable logic device being further configured to transmit a processor reset signal to the processor upon completion of configuration of the configurable logic device; and the processor being configured to initiate receiving of configuration data from the data device in response to the processor reset signal.

11. The computing device as set forth in claim 10, where the computing device being further configured to transmit:

signals for causing the configuration data to be transmitted from the data device to the processor and the configurable logic device serially.

12. The computing device as set forth in claim 10, where the computing device being further configured to transmit:

signals for causing a first control signal to be transmitted from the configurable logic device to the data device, a first portion of the configuration data being transmitted from the data device to the configurable logic device as a function of the first control signal; and signals for causing a second control signal to be transmitted from the processor to the data device, a second portion of the configurable data being transmitted from the data device to the processor as a function of the second control device.

13. The computing device as set forth in claim 12, where the computing device being further configured to transmit:

signals for causing the second control signal and the second portion of the configuration data to be transmitted from the data device to the processor via the configurable logic device.

14. The computing device as set forth in claim 13, where the computing device being further configured to transmit:

signals for causing the second portion of the configuration data to be transmitted from the data device to the processor as a function of both the first and second control signals.

15. The computing device as set forth in claim 12, where the computing device being further configured to transmit:

signals for causing the second control signal and the second portion of the configuration data to be communicated between the data device to the processor without passing through the configurable logic device.

* * * * *